(12) United States Patent
Kozyuk et al.

(10) Patent No.: US 9,303,216 B2
(45) Date of Patent: Apr. 5, 2016

(54) METHOD FOR UPGRADING HEAVY HYDROCARBON OIL

(75) Inventors: Oleg Kozyuk, North Ridgeville, OH (US); Peter Reimers, Shaker Heights, OH (US); Paul A. Reinking, North Olmstead, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 504 days.

(21) Appl. No.: 13/351,598

(22) Filed: Jan. 17, 2012

(65) Prior Publication Data
US 2012/0181216 A1    Jul. 19, 2012

Related U.S. Application Data

(60) Provisional application No. 61/434,098, filed on Jan. 19, 2011.

(51) Int. Cl.
*C10G 47/22* (2006.01)
*C10G 45/00* (2006.01)

(52) U.S. Cl.
CPC ............... *C10G 45/00* (2013.01); *C10G 47/22* (2013.01); *C10G 2300/302* (2013.01); *C10G 2300/308* (2013.01); *C10G 2300/4006* (2013.01)

(58) Field of Classification Search
CPC ........ C10G 31/06; C10G 9/007; C10G 45/00; C10G 47/00; C10G 47/22; C10G 49/00; C10G 99/00; C10G 2300/302; C10G 2300/308; C10G 2300/4006; B01F 3/04; B01F 3/04439; B01F 5/0652; B01F 5/0653

USPC .................................. 208/85, 106, 142, 107
See application file for complete search history.

(56) References Cited

U.S. PATENT DOCUMENTS

| | | | |
|---|---|---|---|
| 5,096,566 A * | 3/1992 | Dawson et al. ............... 208/106 |
| 5,492,654 A | 2/1996 | Kozjuk et al. |
| 5,810,052 A | 9/1998 | Kozyuk |
| 5,931,771 A | 8/1999 | Kozyuk |
| 5,937,906 A | 8/1999 | Kozyuk |
| 5,969,207 A | 10/1999 | Kozyuk |
| 5,971,601 A | 10/1999 | Kozyuk |
| 6,012,492 A | 1/2000 | Kozyuk |
| 6,035,897 A | 3/2000 | Kozyuk |
| 6,502,979 B1 | 1/2003 | Kozyuk |
| 6,802,639 B2 | 10/2004 | Kozyuk |

(Continued)

FOREIGN PATENT DOCUMENTS

WO    WO2010087780    8/2010

OTHER PUBLICATIONS

Copy of Written Opinion of the International Searching Authority issued in International Application No. PCT/US2012/021517.

*Primary Examiner* — Prem C Singh
*Assistant Examiner* — Brandi M Doyle
(74) *Attorney, Agent, or Firm* — Pearne & Gordon LLP

(57) ABSTRACT

A process for upgrading hydrocarbon oil including mixing hydrocarbon oil with hydrogen gas and heating the hydrogen-enriched hydrocarbon oil before passing the oil through a cavitation apparatus to induce hydrotreating. Hydrotreating is achieved by hydrodynamically generating hydrogen-filled cavitation bubbles and collapsing the bubbles in the hydrocarbon oil under static pressure. The hydrotreating process can increase the API gravity of the hydrocarbon oil and reduce the viscosity of the hydrocarbon oil.

18 Claims, 4 Drawing Sheets

(56) References Cited

U.S. PATENT DOCUMENTS

| | | |
|---|---|---|
| 6,857,774 B2 | 2/2005 | Kozyuk |
| 7,338,551 B2 | 3/2008 | Kozyuk |
| 8,105,480 B2 | 1/2012 | Chornet et al. |
| 2005/0136123 A1 | 6/2005 | Kozyuk |
| 2006/0081501 A1 | 4/2006 | Kozyuk |
| 2008/0217211 A1* | 9/2008 | Chornet et al. ............... 208/106 |
| 2010/0101978 A1* | 4/2010 | Gordon et al. ................. 208/49 |
| 2010/0122933 A1 | 5/2010 | Khan |
| 2010/0175309 A1 | 7/2010 | Kozyuk et al. |
| 2011/0163005 A1* | 7/2011 | Lourenco et al. ............. 208/107 |

\* cited by examiner

METHOD FOR UPGRADING HEAVY HYDROCARBON OIL

This application claims the benefit of U.S. provisional application Ser. No. 61/434,098 filed Jan. 19, 2011, the contents of which are incorporated herein in their entirety by reference.

FIELD

The invention relates to a method of improving the quality of heavy, viscous hydrocarbon oil, and more particularly to improving the flow properties of heavy, viscous hydrocarbon oil to make it easier to refine and transport.

BACKGROUND

Light oil reserves are gradually being depleted and the cost to develop, such as lifting, mining and extracting, heavy oil resources is increasing, and thus a growing need arises to explore new upgrading technologies that can convert heavy oils and bitumen into lighter, usable products.

Heavy hydrocarbon oils are generally referred to as oils with high viscosity or an API gravity less than about 23 degree. Large quantities of such heavy hydrocarbon oils are available in oil deposits in Western Canada and heavy bituminous oils extracted from oil sands. Other sources of heavy hydrocarbon oils can be materials such as atmospheric tar bottoms products, vacuum tar bottoms products, heavy cycle oils, shale oils, coal-derived liquids, crude oil residue, topped crude oils, and combinations thereof.

Efficient processing and viscosity reduction of heavy hydrocarbon oils is desirable for the production, transport and refining operations of crude oil. A drawback of known methods of treating heavy hydrocarbon oils is that the viscosity reduction effect is reversible such that the reduced viscosity of the heavy oil recovers back towards the original viscosity. Further, changes in the API gravity are less than 2 units and in some cases no change in API gravity is detected. Accordingly, it is desirable to develop an efficient process for upgrading heavy hydrocarbon oils wherein the viscosity reduction is stable subsequent to processing and a significant change in API gravity of the oil is realized.

SUMMARY

A process for upgrading hydrocarbon oil including mixing a hydrocarbon oil with hydrogen gas to form a hydrogen-enriched hydrocarbon oil and subsequently heating the hydrogen-enriched hydrocarbon oil to a temperature in the range of 380° to 500° C. The heated hydrogen-enriched hydrocarbon oil is passed through a cavitation apparatus to form a hydrodynamic cavitation zone containing hydrogen gas-filled cavitation bubbles. The hydrogen-filled cavitation bubbles are collapsed under static pressure to induce hydrotreating of the hydrocarbon oil with the hydrogen gas, wherein the API gravity of the hydrocarbon oil is increased and thus resulting in lighter or less dense hydrocarbon oil.

A process for upgrading hydrocarbon oil including mixing a hydrocarbon oil with hydrogen gas to form a hydrogen-enriched hydrocarbon oil and subsequently heating the hydrogen-enriched hydrocarbon oil to a temperature in the range of 380° to 500° C. The heated hydrogen-enriched hydrocarbon oil is passed through a cavitation apparatus to form a hydrodynamic cavitation zone containing hydrogen gas-filled cavitation bubbles. The hydrogen-filled cavitation bubbles are collapsed under static pressure to induce hydrotreating of the hydrocarbon oil with the hydrogen gas, wherein the viscosity of the hydrocarbon oil is reduced.

DETAILED DESCRIPTION

Herein, when a range such as 5-25 (or 5 to 25) is given, this means preferably at least 5 and, separately and independently, preferably not more than 25. In an example, such a range defines independently not less than 5, and separately and independently, not more than 25.

Processes for upgrading hydrocarbon oil are described herein. Hydrocarbon oil can be combined with hydrogen gas, for example, hydrocarbon oil being saturated with hydrogen gas, before being hydrotreated under hydrodynamic cavitation to produce upgraded hydrocarbon oil having increased API gravity and/or reduced viscosity. Hydrodynamic cavitation can generate physical processing conditions that are desirable for destructive hydrogenation, which can take place at the boundary of a cavitation bubble, such as a hydrogen-filled bubble, and the surrounding liquid medium, such as hydrocarbon oil, in a hydrodynamic cavitation zone. Hydrodynamic cavitation as described below yields high pressure, such as above 600 psi, and high temperature, such as above 380° C., processing conditions that are desirable for effectively hydrotreating hydrocarbon oil. Destructive hydrogenation can result in cracking the hydrocarbon molecular bonds of the surrounding liquid medium, such as hydrocarbon oil, and the associated hydrogen saturation of the remaining hydrocarbon fragments, which can create stable lower boiling point hydrocarbon oil products. The stable hydrocarbon oil having increased API gravity and/or reduced viscosity preferably retains the upgraded physical properties over time or permanently such that the improved API gravity and/or viscosity parameters do not return to original values measured in the pre-processed hydrocarbon oil.

Figure 1:
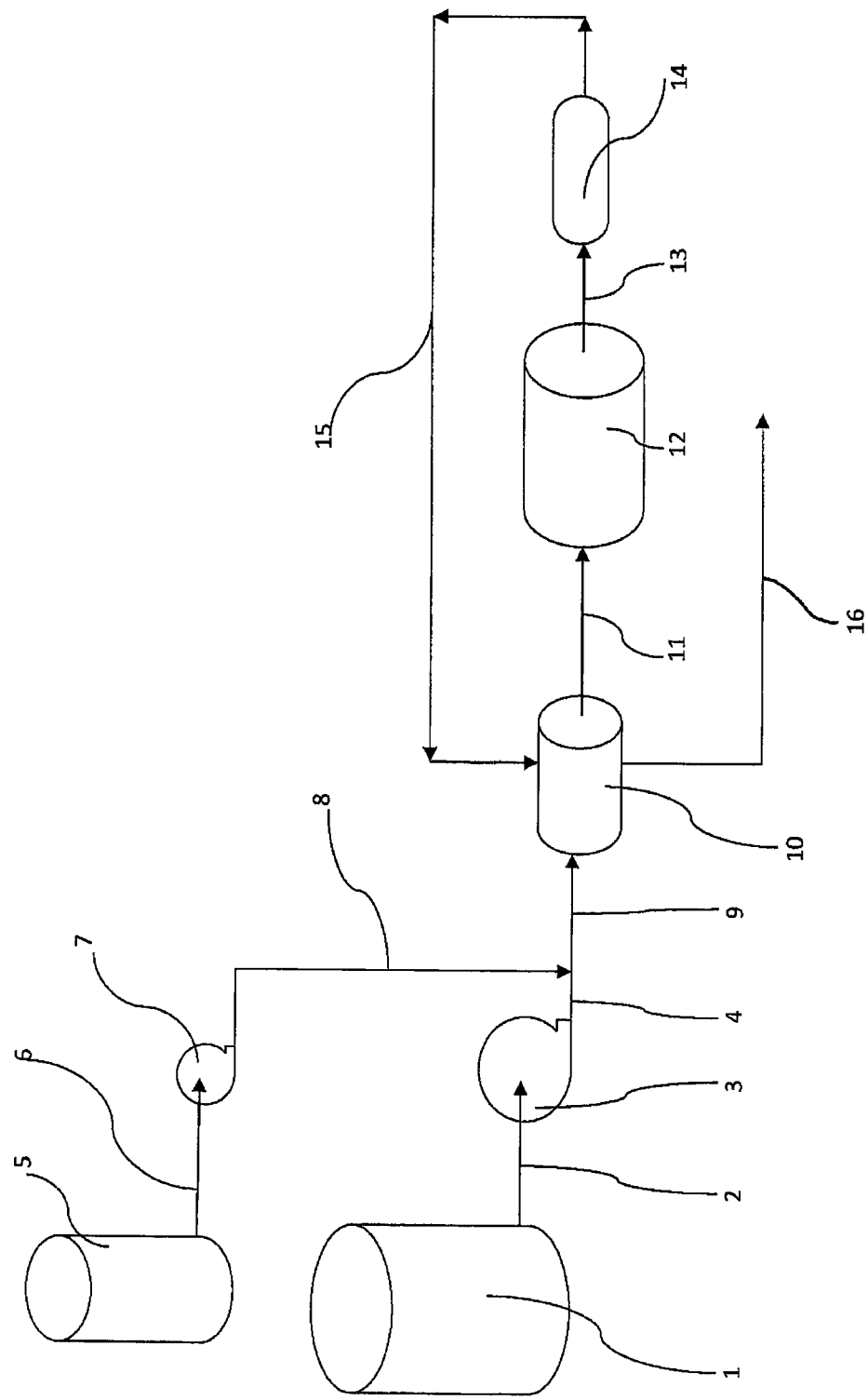
FIG. 1 shows a flow diagram of a hydrocarbon oil upgrading process using cavitation.

Turning to the figures, FIG. 1 shows a schematic flow diagram of a process for upgrading hydrocarbon oil. Hydrocarbon oil feedstock is provided in storage vessel 1. The storage vessel 1 can be an atmospheric or pressurized tank, and further include a heating means, such as a heating jacket, for heating the hydrocarbon oil feedstock. Hydrocarbon oil feedstock can be dense (low API gravity) and have a high viscosity, which can make the hydrocarbon oil difficult to pump. Preheating the hydrocarbon oil feedstock can increase flowability and ease pumping. The hydrocarbon oil feedstock 2 can be transferred from storage vessel 1 to a hydrogen mixing station by a pump 3.

Hydrogen gas is provided in storage vessel 5, which preferably pressurized. The stored hydrogen gas 6 can be transferred to a compressor 7 for raising the pressure of the hydrogen gas to the desired level for mixing with the hydrocarbon oil feedstock. For example, the hydrogen gas can be pressurized in the range of 50 to 300 psi. The pressurized hydrogen gas 8 is mixed with the hydrocarbon oil feedstock 4 to form a hydrogen-enriched hydrocarbon oil 9 stream. Preferably, the hydrocarbon oil feedstock is saturated with hydrogen gas under pressure. Hydrogen gas can be mixed with the hydrocarbon oil feedstock by conventional methods, for example, injecting pressurized hydrogen gas into a pipe with a port, the use of a static mixer, orifice plate, perforated plate, nozzle, venturi eductor, jet mixer or controlled flow cavitation apparatus. Mixing pressures are preferably at a level to permit the saturation of the hydrocarbon oil feedstock with hydrogen gas. For instance, mixing pressure preferably does not exceed 2,000 psi. Hydrogen gas is mixed with the hydrocarbon oil feedstock in a weight ratio in the range of 0.005-0.03:1, preferably 0.007-0.025:1, and more preferably 0.01-0.02:1 (hydrogen gas:hydrocarbon oil).

The hydrogen-enriched hydrocarbon oil 9 stream can be heated to a temperature in the range of 380° to 500° C. by any conventional heating method, such as by one or a combination of heating components. As shown, the hydrogen-enriched hydrocarbon oil 9 stream can be heated by passing through heat exchanger 10. The preheated hydrogen-enriched hydrocarbon oil 11 can be further heated in a heat exchanger 12, such as an oven. The heated hydrogen-enriched hydrocarbon oil 13 can be fed to a cavitation apparatus 14 for inducing hydrotreating of the hydrocarbon oil. The cavitation apparatus 14 preferably includes at least one localized flow constriction, such as an orifice, baffle or nozzle, for generating a hydrodynamic cavitation zone. The cavitation apparatus 14 can be as described in U.S. Pat. Nos. 5,810,052; 5,931,771; 5,937,906; 5,971,601; 6,012,492; 6,502,979; 6,802,639 and 6,857,774.

The cavitation apparatus 14 can create a hydrodynamic cavitation zone containing hydrogen gas-filled cavitation bubbles. The hydrogen gas-filled cavitation bubbles are generated by passing the hydrogen-enriched hydrocarbon oil 13 through the localized flow constriction of the cavitation apparatus 14 at an inlet pressure of at least 300, 400, 500, 600, 700, 800, 900, 1000, 1100, 1200, 1300, 1400, 1500, 1600, 1700, 1800, 1900 or 2000 psi. The pressure drop across the localize flow constriction is at least 300, 400, 500, 600, 700, 800, 900, 1000, 1100, 1200, 1300, 1400, 1500, 1600 or 1700 psi. The hydrogen gas-filled cavitation bubbles can be maintained in the hydrodynamic cavitation zone for less than 0.1, 0.05, 0.01, 0.005, 0.0025 or 0.001 second. The hydrogen gas-filled cavitation bubbles are collapsed under static pressure downstream of the localized flow constriction of the cavitation apparatus 14. The collapsing of the hydrogen gas-filled cavitation bubbles induces hydrotreating of the hydrocarbon oil with the hydrogen gas thereby increasing the API gravity of the hydrocarbon oil and/or reducing the viscosity of the hydrocarbon oil. The static pressure for collapsing the hydrogen gas-filled cavitation bubbles is at least 150 psi, and preferably in the range of 150-500, 150-300 or 150-200 psi.

The hydrotreated hydrocarbon oil 15 downstream of the cavitation apparatus 14 can have an API gravity increase (i.e. lighter) of greater than 10, 20, 30, 40, 50, 60, 70, 80 or 90 percent. For instance, the API gravity of the hydrotreated hydrocarbon oil 15 can be 1, 2, 3, 4, 5, 6, 7, 8, 9 or 10 degree higher than the untreated hydrocarbon oil 2. The hydrotreated hydrocarbon oil 15 can have a viscosity reduction of at least 10, 20, 30, 40, 50, 60, 70, 80, 90, 95 or 99.5 percent. For instance, the viscosity of the hydrotreated oil 15 can be 100, 500, 1,000, 5,000, 10,000, 15,000, 20,000, 25,000 or 30,000 centiStokes (cSt) lower than the untreated hydrocarbon oil 2.

The hydrotreated hydrocarbon oil 15 can be used as a heating medium for pre-heating the hydrogen-enriched hydrocarbon oil 9. For example, the hydrotreated hydrocarbon oil 15, which can be at a temperature of 380° to 500° C., can be passed through heat exchanger 10 before being cooled to result in an upgraded hydrocarbon oil 16. The heat exchange from the hydrotreated hydrocarbon oil 15 to the hydrogen-enriched hydrocarbon oil 9 functions to cool the hydrotreated oil.

Figure 2:
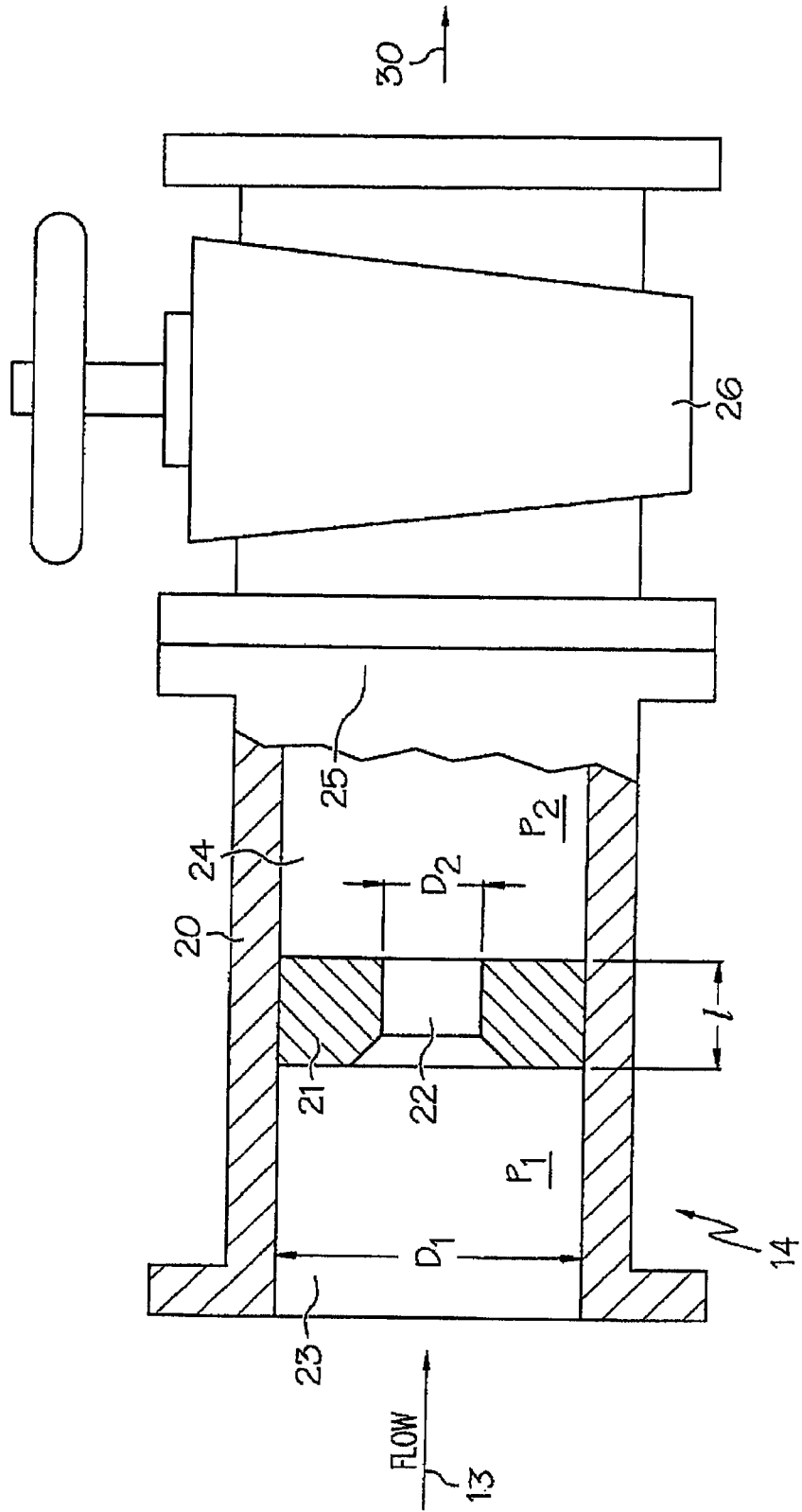
FIG. 2 is a cross section view of a cavitation apparatus.

FIG. 2 shows a cavitation apparatus 14 having a localized flow constriction 21, such as an orifice 22, for upgrading hydrocarbon oil 13. The orifice 22 can be any shape, for example, cylindrical, conical, oval, right-angled, square, etc. Depending on the size and shape of the orifice 22, the shape of the cavitation jets flowing from the localized flow constriction 21 in the hydrodynamic cavitation zone can be controlled. The orifice 22 can have any diameter, $D_2$, for example, the diameter can be greater than 0.1, 0.2, 0.4, 0.6, 0.8, 1, 2, 5, 10, 20, 50, 80 or 100 mm. In one example, the orifice 22 diameter can be about 0.4 mm to about 2 mm.

Alternatively, the localized flow constriction 21 can include baffles, nozzles and the like. Although not shown, the flow-through channel 20 can have two or more localized flow constrictions in series, such as a first localized flow constriction having one orifice of a desired diameter and a second localized flow constriction having one orifice of a desired diameter. The diameters of the first and second orifices can be the same or vary.

As shown, the first chamber 23 has a static pressure $P_1$ and the second chamber 24 has a static pressure $P_2$. Flow into the apparatus 14 can be provided with the aid of fluid pumping devices as known in the art, such as a pump, centrifugal pump, positive-displacement pump or diaphragm pump. An auxiliary pump can provide flow under a static pressure $P_1$, or the processing pressure, to the first chamber 23. The processing pressure is preferably at least 100, 200, 300, 500, 700, 900, 1,000, 1,200, 1,400, 1,600, 1,800 or 2,000 psi. The processing pressure is reduced as the hydrogen-enriched hydrocarbon oil 13 passes through the flow-through channel 20 and orifice 22. Maintaining a pressure differential across the orifice 22 allows control of the cavitation intensity in the hydrodynamic cavitation zone in the flow-through channel 20. The pressure differential across the orifice 22 is preferably at least 100, 200, 300, 500, 700, 900, 1,000, 1,200 or 1,400 psi. The velocity of the hydrogen-enriched hydrocarbon oil 13 through the orifice 22 in the apparatus 14 is preferably at least 1, 5, 10, 15, 20, 25, 30, 40, 50, 60 or 70 meters per second (m/s).

The length (l) in orifice 22 in the localized flow constriction 21 is selected in such a manner in order that the residence time of the hydrogen gas-filled cavitation bubbles in the orifice 22 and/or the second chamber 24 is less than 0.1, 0.05, 0.01, 0.005, 0.0025 or 0.001 second. Downstream 25 of the orifice 22, a valve 26 can be used to adjust the desired static pressure $P_2$ for collapsing the hydrogen gas-filled cavitation bubbles downstream of the localized flow constriction of the cavitation apparatus 14. The hydrotreated hydrocarbon oil 30 exits the valve 26 before being subsequently cooled to result in an upgraded hydrocarbon oil.

Figure 3:
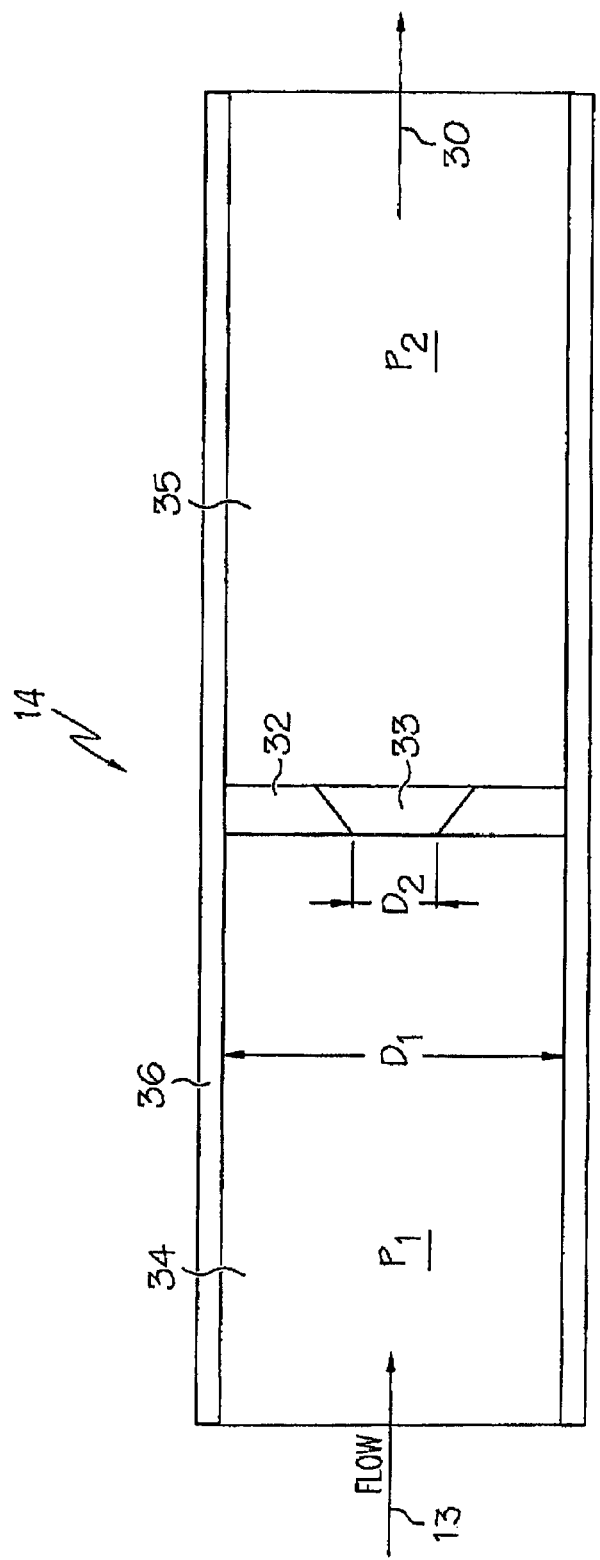
FIG. 3 is a cross section view of a cavitation apparatus.

FIG. 3 illustrates a cavitation apparatus 14 having a sharp-edged orifice 33 for generating a hydrodynamic cavitation zone for hydrotreating hydrogen-enriched hydrocarbon oil 13. The sharp-edged orifice 33 has a diameter, $D_2$, in the range of 0.2 to 100 mm. The flow-through channel 36 has an inlet diameter, $D_1$, in the range of 0.25 to 80 inches. The localized flow constriction 32 divides the flow-through channel 36 into a first chamber 34 having static pressure $P_1$ and a second chamber 35 having static pressure $P_2$. Preferably, static pressure $P_2$ induces the collapse of hydrogen gas-filled cavitation bubbles and is greater than 150 psi, and more preferably greater than 300 psi. In operation, hydrogen-enriched hydrocarbon oil 13 passes through the flow-through channel 36 and through the localized flow constriction 32 to generate hydrogen gas-filled cavitation bubbles that are collapsed under static pressure in the second chamber 35. The hydrotreated hydrocarbon oil 30 exits the second chamber 35 before being subsequently cooled to result in an upgraded hydrocarbon oil.

Although not shown, the flow-through channel 36 can have additional localized flow constrictions, such as a valve, downstream of the first localized flow constriction 32 in order to alter the cavitation conditions and static pressure $P_2$. The additional localized flow constriction can be adjustable, for example a valve, or non-adjustable, for example an orifice.

Figure 4:
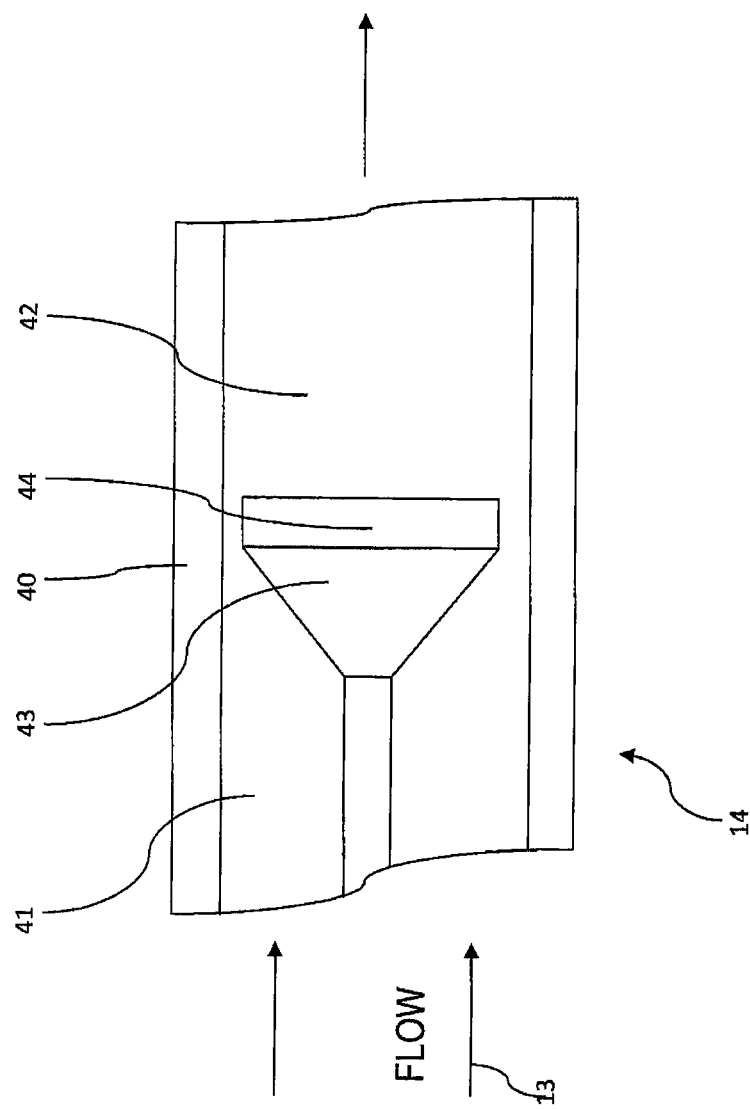
FIG. 4 is a cross section view of a cavitation apparatus.

In another embodiment, FIG. 4 provides a cross section view of a cavitation apparatus 14. A bluff body 43 is positioned in the flow-through channel 40 to create a localized flow constrictions, wherein two localized flow restrictions are created in parallel to one another, each localized flow restriction positioned between the flow-through channel 40 and the top or bottom of the bluff body 43. The localized flow constrictions divide the flow-through channel 40 into two chambers, a first chamber 41 having static pressure and a second cavitation chamber 42 having static pressure. Second chamber 42 houses the hydrodynamic cavitation zone as discussed above. In operation, hydrogen-enriched hydrocarbon oil 13 passes through the flow-through channel 40 and around bluff body 43 to generate hydrogen gas-filled cavitation bubbles that are collapsed under static pressure in the second cavitation chamber 42.

Although not shown, the flow-through channel 40 can have two or more bluff bodies or localized flow constrictions in series. For example, a first cone-shaped bluff body having a desired diameter and a second cone-shaped bluff body having a desired diameter can be arranged in series. The diameters of the first and second bluff bodies can be the same or vary.

In order to promote a further understanding of the invention, the following examples are provided. These examples are shown by way of illustration and not limitation. The upgrading hydrocarbon oil process of Examples 1 through 3 was carried out in a cavitation apparatus substantially similar to the cavitation apparatus 14 as shown in FIG. 2 herein. The cavitation apparatus included a single orifice having a diameter of 0.016 inches (0.4 mm) and was capable of operating a pressure of up to 3,000 psi with a nominal flow rate of up to 300 mL/min.

Example 1

A feed stock of Canadian heavy crude oil was used. The Canadian heavy crude oil had an average API gravity of 10.3 degree, a specific gravity of 0.9979 at a temperature of 23° C. and a kinematic viscosity of 1,070 cSt at a temperature of 50° C.

The Canadian heavy crude oil was passed through a pipe at a processing pressure of 1,800 psi and a flow rate of 190 mL/min by a high pressure pump. Hydrogen gas from a pressurized tank was introduced into the heavy crude oil at a weight ratio of 0.009:1 (hydrogen gas:hydrocarbon oil) by a port in the pipe. The hydrogen-enriched hydrocarbon oil was heated in an oven to 430° C. The heated hydrogen-enriched hydrocarbon oil was pumped through a cavitation apparatus having a single orifice of diameter 0.4 mm. The pressure drop across the orifice was sufficient to generated a hydrodynamic cavitation zone containing hydrogen gas-filled bubbles that were collapsed downstream of the orifice under a static pressure of 410 psi. The pressure drop across the orifice was about 1400 psi.

The hydrocarbon oil and hydrogen gas mixture and hydrogen gas-filled bubbles were maintained in the hydrodynamic cavitation zone for 0.00082 second. The upgraded hydrocarbon oil (i.e. downstream of the hydrodynamic cavitation zone) was passed through a heat exchanger and the temperature of the upgraded hydrocarbon oil was reduced to 40° C.

The upgraded hydrocarbon oil had an API gravity of 15.33 degree, a specific gravity of 0.9937 at 23° C. and a kinematic viscosity of 130.5 cSt at 50° C. The upgraded hydrocarbon oil had an increase in API gravity of about 49 percent and a reduction in viscosity of about 88 percent. The increased API gravity and reduced viscosity of the upgraded hydrocarbon oil did not reverse and return to original values.

Example 2

A feed stock of Venezuela heavy crude oil was used. The Venezuela heavy crude oil had an average API gravity of 7.5 degree and a kinematic viscosity of 23,480 cSt at a temperature of 50° C.

The Venezuela heavy crude oil was passed through a pipe at a processing pressure of 800 psi and a flow rate of 130 mL/min by a high pressure pump. Hydrogen gas from a pressurized tank was introduced into the heavy crude oil at a weight ratio of 0.012:1 (hydrogen gas:hydrocarbon oil) by a port in the pipe. The hydrogen-enriched hydrocarbon oil was heated in an oven to 450° C. The heated hydrogen-enriched hydrocarbon oil was pumped through a cavitation apparatus having a single orifice of diameter 0.4 mm. The pressure drop across the orifice was sufficient to generated a hydrodynamic cavitation zone containing hydrogen gas-filled bubbles that were collapsed downstream of the orifice under a static pressure of 160 psi. The pressure drop across the orifice was about 640 psi.

The hydrocarbon oil and hydrogen gas mixture and hydrogen gas-filled bubbles were maintained in the hydrodynamic cavitation zone for 0.0012 second. The upgraded hydrocarbon oil (i.e. downstream of the hydrodynamic cavitation zone) was passed through a heat exchanger and the temperature of the upgraded hydrocarbon oil was reduced to 40° C.

The upgraded hydrocarbon oil had an API gravity of 12.1 degree and a kinematic viscosity of 465 cSt at 50° C. The upgraded hydrocarbon oil had an increase in API gravity of about 61 percent and a reduction in viscosity of about 98 percent. The increased API gravity and reduced viscosity of the upgraded hydrocarbon oil did not reverse and return to original values.

Example 3

A feed stock of Venezuela heavy crude oil was used. The Venezuela heavy crude oil had an average API gravity of 7.5 degree and a kinematic viscosity of 23,480 cSt at a temperature of 50° C.

The Venezuela heavy crude oil was passed through a pipe at a processing pressure of 800 psi and a flow rate of 130 mL/min by a high pressure pump. Hydrogen gas from a pressurized tank was introduced into the heavy crude oil at a weight ratio of 0.02:1 (hydrogen gas:hydrocarbon oil) by a port in the pipe. The hydrogen-enriched hydrocarbon oil was heated in an oven to 450° C. The heated hydrogen-enriched hydrocarbon oil was pumped through a cavitation apparatus having a single orifice of diameter 0.4 mm. The pressure drop across the orifice was sufficient to generated a hydrodynamic cavitation zone containing hydrogen gas-filled bubbles that were collapsed downstream of the orifice under a static pressure of 160 psi. The pressure drop across the orifice was about 640 psi.

The hydrocarbon oil and hydrogen gas mixture and hydrogen gas-filled bubbles were maintained in the hydrodynamic cavitation zone for 0.0012 second. The upgraded hydrocarbon oil (i.e. downstream of the hydrodynamic cavitation zone) was passed through a heat exchanger and the temperature of the upgraded hydrocarbon oil was reduced to 40° C.

The upgraded hydrocarbon oil had an API gravity of 13.5 degree and a kinematic viscosity of 130.7 cSt at 50° C. The upgraded hydrocarbon oil had an increase in API gravity of about 80 percent and a reduction in viscosity of about 99.4 percent. The increased API gravity and reduced viscosity of the upgraded hydrocarbon oil did not reverse and return to original values.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. A process for upgrading hydrocarbon oil comprising:
    (a) mixing hydrocarbon oil having an API gravity less than 23 degrees with hydrogen gas to form a hydrogen-enriched hydrocarbon oil stream consisting of said hydrocarbon oil and said hydrogen gas;
    (b) heating said hydrogen-enriched hydrocarbon oil to a temperature in the range of 380° to 500° C.;
    (c) passing said hydrogen-enriched hydrocarbon oil through a cavitation apparatus to form a hydrodynamic cavitation zone downstream of a local constriction, the hydrodynamic cavitation zone containing hydrogen gas-filled cavitation bubbles;
    (d) collapsing said hydrogen gas-filled cavitation bubbles under static pressure of at least 150 psi to induce hydrotreating said hydrocarbon oil with said hydrogen gas, wherein the API gravity of said hydrocarbon oil is increased.

2. The process of claim 1, said hydrogen gas-filled cavitation bubbles being maintained in said hydrodynamic cavitation zone for less than 0.01 second.

3. The process of claim 1, said API gravity of said hydrocarbon oil being increased by at least 10 percent.

4. The process of claim 1, said API gravity of said hydrocarbon oil being increased by at least 40 percent.

5. The process of claim 1, said API gravity of said hydrocarbon oil being increased by more than 2 degrees.

6. The process of claim 5, said API gravity of said hydrocarbon oil being increased by more than 2 degrees such that said API gravity remains increased by more than 2 degrees for at least 2 weeks.

7. The process of claim 1, said hydrocarbon oil having a reduction in viscosity of at least 50 percent.

8. The process of claim 1, said hydrogen gas being mixed with said hydrocarbon oil in a weight ratio of less than 0.03:1.

9. The process of claim 1, said cavitation apparatus comprising a flow through channel and a localized flow constriction.

10. The process of claim 9, said localized flow constriction being an orifice, baffle or nozzle.

11. The process of claim 10, passing said hydrogen-enriched hydrocarbon oil passing through said orifice to create a pressure differential across said orifice of at least 150 psi.

12. A process for upgrading hydrocarbon oil comprising:
    (a) mixing hydrocarbon oil having an API gravity of less than 23 degrees with hydrogen gas to form a hydrogen-enriched hydrocarbon oil stream consisting of said hydrocarbon oil and said hydrogen gas;
    (b) heating said hydrogen-enriched hydrocarbon oil to a temperature in the range of 380° to 500° C.;
    (c) passing said hydrogen-enriched hydrocarbon oil through a cavitation apparatus to form a hydrodynamic cavitation zone downstream of a local constriction, the hydrodynamic cavitation zone containing hydrogen gas-filled cavitation bubbles;
    (d) collapsing said hydrogen gas-filled cavitation bubbles under static pressure of at least 150 psi to induce hydrotreating said hydrocarbon oil with said hydrogen gas, wherein the viscosity of said hydrocarbon oil is reduced.

13. The process of claim 12, said viscosity of said hydrocarbon oil being reduced by at least 50 percent.

14. The process of claim 12, said viscosity of said hydrocarbon oil being reduced by at least 80 percent.

15. The process of claim 12, said viscosity of said hydrocarbon oil being reduced by at least 80 percent such that said viscosity remains reduced by at least 80 percent for at least 2 weeks.

16. The process of claim 12, said hydrocarbon oil having an increase in API gravity of at least 10 percent.

17. The process of claim 12, said hydrogen gas-filled cavitation bubbles being maintained in said hydrodynamic cavitation zone for less than 0.01 second.

18. The process of claim 12, said hydrogen gas being mixed with said hydrocarbon oil in a weight ratio of less than 0.03:1.

* * * * *